(12) United States Patent
Hisamoto

(10) Patent No.: US 8,049,792 B2
(45) Date of Patent: Nov. 1, 2011

(54) IMAGE CAPTURE APPARATUS

(75) Inventor: Shinji Hisamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 673 days.

(21) Appl. No.: 12/033,309

(22) Filed: Feb. 19, 2008

(65) Prior Publication Data
US 2008/0198241 A1   Aug. 21, 2008

(30) Foreign Application Priority Data

Feb. 20, 2007   (JP) ................................ 2007-040001

(51) Int. Cl.
*H04N 5/76*   (2006.01)
(52) U.S. Cl. ............. 348/231.1; 348/231.99; 348/231.3; 348/231.7; 348/231.9
(58) Field of Classification Search ........................ None
See application file for complete search history.

(56) References Cited

U.S. PATENT DOCUMENTS

| | | | |
|---|---|---|---|
| 7,277,131 B2 * | 10/2007 | Wakabayashi | 348/333.02 |
| 7,426,333 B2 | 9/2008 | Kaise et al. | |
| 7,688,361 B2 * | 3/2010 | Tsumura et al. | 348/231.99 |
| 7,689,096 B2 | 3/2010 | Yokota et al. | |

FOREIGN PATENT DOCUMENTS

| JP | 2003-296177 A | 10/2003 |
|---|---|---|
| JP | 2004-086823 A | 3/2004 |

\* cited by examiner

*Primary Examiner* — Anthony J Daniels
(74) *Attorney, Agent, or Firm* — Canon U.S.A., Inc. IP Division

(57) ABSTRACT

An image capture apparatus includes an image capture unit, a writing unit, a calculation unit, and a determination unit. The image capture unit captures an image. The writing unit writes the captured image in a recording medium. The calculation unit calculates a number of free clusters in the recording medium. The determination unit determines whether the recording medium has been removed from the image capture apparatus. If the determination unit determines that the recording medium has been removed from the image capture apparatus, a free space in the recording medium is calculated from the calculated number of free clusters. If the determination unit determines that the recording medium has not been removed from the image capture apparatus, the number of free clusters from a predetermined area in the recording medium is acquired and the free space in the recording medium is calculated from the acquired number of free clusters.

20 Claims, 5 Drawing Sheets

IMAGE CAPTURE APPARATUS

BACKGROUND OF THE INVENTION

1. Field of the Invention

The present invention relates to an image capture apparatus, such as an electronic camera, configured to record a captured image including a still image and a moving image in a recording medium such as a semiconductor memory, a hard disk or the like.

2. Description of the Related Art

Some devices using a recording medium refer to a number of free clusters in acquiring a free space of the recording medium. Generally, the number of free clusters is calculated from the number of unused clusters which is acquired from file management information in a file system. A file system managing a recording medium of high capacity, for example, 2 GB or more, processes large amounts of data each time in acquiring the number of free clusters. Thus, in some devices, the number of free clusters is included in advance in the file management information. If the device employs a file system which records the number of free clusters, the number of free clusters can be acquired from recorded information.

A method of counting the number of free clusters, hereinafter referred to as a "calculation method", takes time in counting the number of free clusters. As a result, when the calculation method is applied to an image capture apparatus such as an electronic camera, the following problems can occur. (1) If the image capture apparatus cannot finish start-up processing until a free space of a recording medium is acquired, an image cannot be captured until the free space is calculated using the number of free clusters. (2) If the image capture apparatus can capture images even if a free space in the recording medium is not acquired, the image capture apparatus can start capturing immediately. However, the captured image may not be recorded in the recording medium until the free space is calculated using the number of free clusters.

On the other hand, a method referring to the number of free clusters recorded in the file management information, hereinafter referred to as a "reference method", is advantageous in that the number of free clusters can be acquired quickly. However, if the number of free clusters recorded in the file management information is incorrect, then a correct free space cannot be calculated. This may cause a significant error such as a recording failure of the captured image in the recording medium. It is possible that the number of free clusters recorded in the file management information is not correct in a case, for example, where one recording medium is shared by a plurality of devices.

SUMMARY OF THE INVENTION

The present invention is directed to an image capture apparatus, such as an electronic camera, which overcomes the above-described drawbacks and disadvantages and which is capable of calculating a free space of a recording medium in a precise and prompt manner.

Further, the present invention is directed to an image capture apparatus, such as an electronic camera, which is capable of starting up promptly and writing a captured image in a recording medium promptly.

According to an aspect of the present invention, an image capture apparatus includes an image capture unit that captures an image, a writing unit that writes the captured image in a recording medium, a calculation unit that calculates a number of free clusters in the recording medium, and a determination unit that determines whether the recording medium has been removed from the image capture apparatus, wherein if the determination unit determines that the recording medium has been removed from the image capture apparatus, the image capture apparatus calculates a free space in the recording medium from the number of free clusters calculated by the calculation unit and if the determination unit determines that the recording medium has not been removed from the image capture apparatus, the image capture apparatus acquires the number of free clusters from a predetermined area in the recording medium and calculates the free space in the recording medium from the acquired number of free clusters.

According to another aspect of the present invention, an image capture apparatus includes an image capture unit that captures an image, a writing unit that writes the captured image in a recording medium, a calculation unit that calculates a number of free clusters in the recording medium, and a determination unit that determines whether a correctness of a free space in the recording medium needs to be checked, wherein if the determination unit determines that the correctness of the free space in the recording medium needs to be checked, the image capture apparatus calculates the free space in the recording medium based on the number of free clusters calculated by the calculation unit and if the determination unit determines that the correctness of the free space in the recording medium needs not to be checked, the image capture apparatus acquires the number of free clusters from a predetermined area in the recording medium and calculates the free space in the recording medium from the acquired number of free clusters.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the attached drawings.

First Exemplary Embodiment

Figure 1:
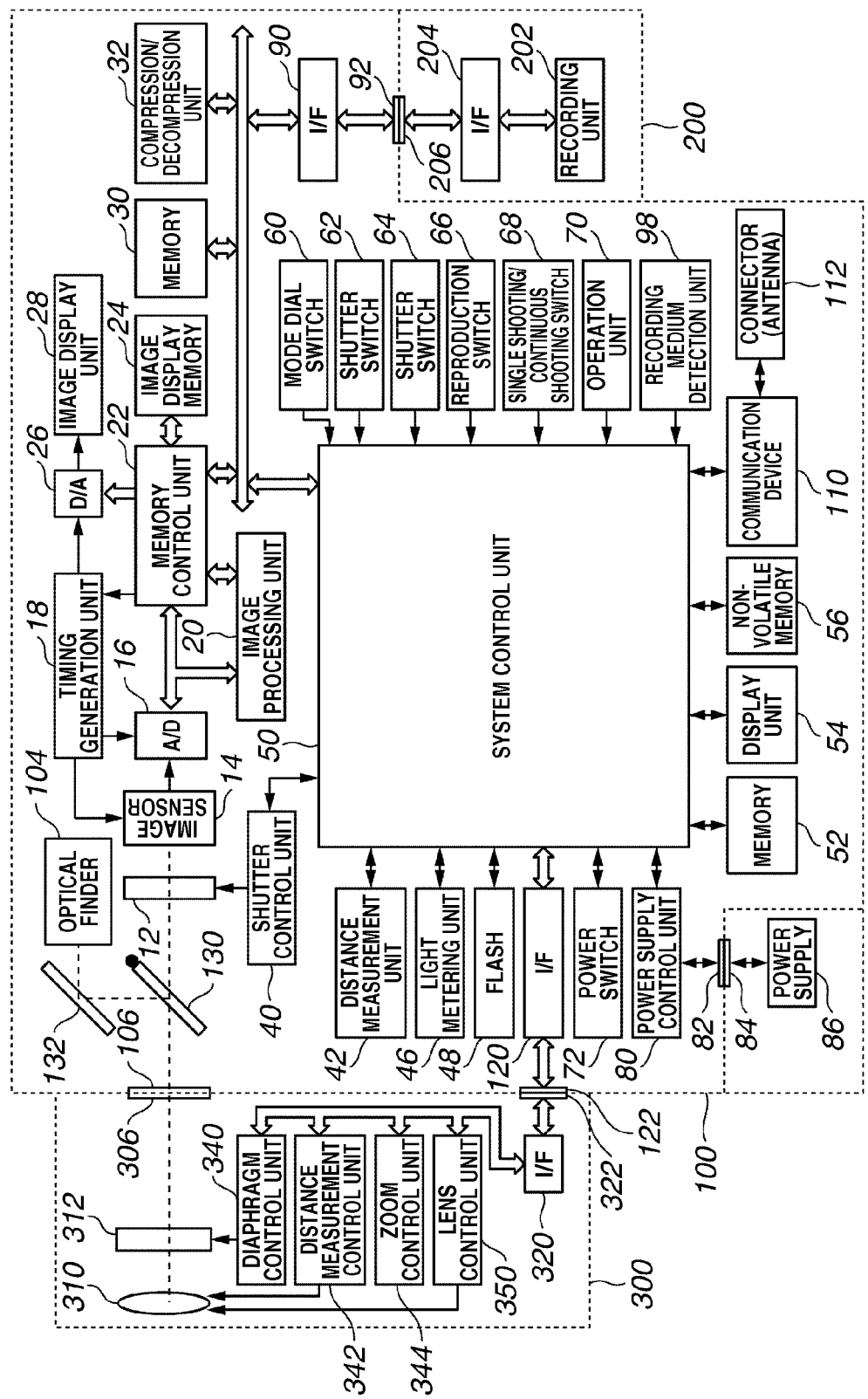
FIG. 1 is a block diagram illustrating a configuration of an electronic camera as an example of an image capture apparatus according to a first and a second exemplary embodiments of the present invention.

FIG. 1 is a block diagram illustrating a configuration of an electronic camera 100 as an example of an image capture apparatus according to a first exemplary embodiment of the present invention.

A lens mount 106 of the electronic camera 100 can be mechanically joined to a mount 306 of a lens unit 300. A light entering a lens 310 of the lens unit 300 passes via a diaphragm 312 and enters a mirror 130. The mirror 130 reflects a part of the incident light from the lens unit 300 to an image sensor 14 through a shutter 12 and the rest of the incident light to a mirror 132. The mirror 132 reflects the incident light and the reflected light enters an optical finder 104. The mirror 130 can be configured as a quick-return mirror. If the mirror 130 is a quick-return mirror, the mirror 130 selectively reflects the incident light from the lens unit 300 to either the image sensor 14 or the optical finder 104 according to a position of the mirror 130.

The image sensor 14 converts an optical image of the incident light which passed through the shutter 12 into an analog image signal. A CCD (charge coupled device) image sensor or a CMOS (complementary metal oxide semiconductor) image sensor can be used as the image sensor 14. An A/D (analog-to-digital) converter 16 digitizes the analog image signal output by the image sensor 14 and converts the digitized signal into image data.

A timing generation unit 18 is controlled by a memory control unit 22 and a system control unit 50. The timing generation unit 18 sends a clock signal to the image sensor 14, the A/D converter 16, and a D/A (digital-to-analog) converter 26.

An image processing unit 20 performs predetermined pixel interpolation processing and color conversion processing on the image data output by the A/D converter 16 or by the memory control unit 22. Further, if necessary, the image processing unit 20 performs calculation processing for performing AF (auto focus) processing, AE (automatic exposure) processing, and EF (flash pre-emission) processing employing TTL (through-the-lens) metering technique on the captured image data. The system control unit 50 controls the diaphragm 312, the shutter 12, a focus of the lens 310, and a flash light of a flash 48 based on the calculation result obtained from the image processing unit 20.

Further, the image processing unit 20 automatically adjusts a color balance of the captured image data based on a certain standard. This is a so-called AWB (auto white balance) processing of the TTL metering technique.

A distance measurement unit 42 and a light metering unit 46 can be used for the AF processing, the AE processing, and the EF processing. That is, zooming of the lens 310 is automatically adjusted according to the distance measured by the distance measurement unit 42 and the diaphragm 312 and the shutter 12 are controlled by a result of the light metering measured by the light metering unit 46 to control the flash light of the flash 48.

Furthermore, the distance measurement unit 42 and the light metering unit 46 can be used together with the image processing unit 20. For example, AF, AE and EF processing can be performed by the image processing unit 20 after the AF, AE, and EF processing are performed by the distance measurement unit 42 and the light metering unit 46.

The memory control unit 22 controls the A/D converter 16, the timing generation unit 18, the image processing unit 20, an image display memory 24, the D/A converter 26, a memory 30, and a compression and decompression unit 32. Data output from the A/D converter 16 is written in the image display memory 24 or the memory 30 by the image processing unit 20 and the memory control unit 22 or by the memory control unit 22.

The image data for display which is written in the image display memory 24 is sent to an image display unit 28 via the D/A converter 26 and displayed as an image. The image display unit 28 includes a liquid crystal display device such as a TFT-LCD (thin film transistor-liquid crystal display). The image display unit 28 can be used as an electronic finder by sequentially displaying the captured image on a screen of the image display unit 28. The system control unit 50 can arbitrarily turn on/off the display of the image display unit 28. Power consumption of the electronic camera 100 can be substantially reduced by turning off the display of the image display unit 28.

The memory 30 stores captured still images and moving images. The memory 30 has a sufficient recording capacity for recording a predetermined number of still images or moving images for a predetermined time. Thus, continuous shooting of a plurality of still images and panorama shooting can be performed at a high speed. Further, the memory 30 can be used as a working area of the system control unit 50.

The compression and decompression unit 32 compresses and decompresses image data by ADCT (adaptive discrete cosine transform), for example. The compression and decompression unit 32 compresses the image data stored in the memory 30, decompresses the compressed data, and writes the resultant data in the memory 30.

A diaphragm control unit 340 controls the diaphragm 312 and a shutter control unit 40 controls the shutter 12 based on the metering information output from the light metering unit 46.

The distance measurement unit 42 is used for the AF processing. Light incident on the lens 310 enters the distance measurement unit 42 through the diaphragm 312, the lens mounts 306 and 106, the mirror 130, and a submirror for distance measurement (not shown) by a single-lens reflex method. The distance measurement unit 42 measures zooming of the lens 310 according to the incident light.

The light metering unit 46 is used for the AE processing. Light incident on the lens 310 enters the light metering unit 46 through the diaphragm 312, the lens mounts 306 and 106, the mirrors 130 and 132, and a light metering lens (not shown) by the single-lens reflex method. The light metering unit 46 measures an amount of exposure according to an amount of the incident light. The EF function is realized by controlling the flash 48 according to a measurement result of the light metering unit 46.

The flash 48 includes a floodlight function and a flash metering control function of AF auxiliary light. The system control unit 50 implements exposure control and AF control using the video TTL metering technique by controlling the shutter control unit 40, the diaphragm control unit 340, and a distance measurement control unit 342 based on the calculation result of the image data captured by the image sensor 14 that is obtained by the image processing unit 20. The system control unit 50 can also perform the AF control by using both the measurement result of the distance measurement unit 42 and the calculation result of the image data captured by the image sensor 14 that is obtained by the image processing unit 20. Furthermore, the system control unit 50 can perform the exposure control by using both the measurement result of the light metering unit 42 and the calculation result of the image data captured by the image sensor 14 that is obtained by the image processing unit 20.

The system control unit 50 controls the whole electronic camera 100. A memory 52 stores constants, variables, and programs used for the operation of the system control unit 50.

A status display unit 54 includes a display device to display operating states and messages using characters and images, and a speaker to notify a user of the operating state with audio. One or the status display units 54 are set at an easily viewable position in the vicinity of an operation unit 70 of the electronic camera 100. The status display unit 54 is, for example, a combination of a liquid crystal display device, a light emitting diode, and a sound production element. The display device of the status display unit 54 is also arranged in the optical finder 104.

Among display contents of the display unit 54, modes and menu options displayed on the display device, such as an LCD, are, for example, a single shot/continuous shooting mode, a self timer mode, a compression ratio, a number of recording pixels, a number of recorded images, a number of images which can be recorded, a shutter speed, an aperture value, exposure compensation, flash setting, red-eye reduction, a macro shooting mode, beep setting, a remaining clock battery level, a remaining battery level, an error, information represented in a plurality of digits, attachment/detachment state of a recording medium 200, attachment/detachment state of the lens unit 300, communication I/F operation, date/time display, and state of connection to an external computer.

Among the display contents of the display unit 54, operation states displayed on the optical finder 104 are, for example, an in-focus state, a shooting ready state, camera-shake warning, a flash charging state, a flash charging completed state, shutter speed, an aperture value, exposure compensation, and a recording medium recording operation.

Among the display contents of the display unit 54, operation states displayed by a LED (light-emitting diode) or the like are, for example, an in-focus state, a shooting ready state, camera-shake warning, a flash charging state, a flash charging completed state, a recording medium recording operation, macro shooting mode setting notification, and a secondary battery charging state.

Among the display contents of the display unit 54, notifications made by a light is, for example, a self timer notification. The self timer notification light can be shared as an AF auxiliary light source.

In a non-volatile memory 56 which is electrically erasable and programmable, for example, an attachment/detachment history record T of the recording medium 200 is stored. The non-volatile memory 56 is, for example, a flash memory.

The system control unit 50 and a recording medium attachment/detachment detection unit 98 operate even if power of the electronic camera 100 is turned off (in other words, a power switch 72 is off) and detect whether the recording medium 200 is attached to or removed from the electronic camera 100. The attachment/detachment history record T is normally "0". However, if the recording medium attachment/detachment detection unit 98 detects that the recording medium 200 is attached to the electronic camera 100 while the power of the electronic camera 100 is turned off, the system control unit 50 changes the attachment/detachment history record T to "1" and writes the record in the non-volatile memory 56. Further, if the recording medium attachment/detachment detection unit 98 detects that the recording medium 200 is removed from the electronic camera 100 while the power of the electronic camera 100 is turned off, the system control unit 50 also changes the attachment/detachment history record T to "1" and writes the record in the non-volatile memory 56. In this way, even if the power of the electronic camera 100 is turned on, turned off, and turned on again while the recording medium 200 is attached, the attachment/detachment history record T will not be changed from "0" to "1" unless the recording medium 200 is removed from the electronic camera 100.

If the recording medium attachment/detachment detection unit 98 detects that the recording medium 200 is removed while the power of the electronic camera 100 is turned on, then the system control unit 50 turns off the power of the electronic camera 100. In this case, the system control unit 50 changes the attachment/detachment history record T from "1" to "0" and writes the record in the non-volatile memory 56.

A mode dial switch 60 allows switching and setting of various shooting modes including a full-automatic shooting mode, a program shooting mode, a shutter-speed priority shooting mode, an aperture priority shooting mode, a manual shooting mode, a focal depth priority shooting mode, a portrait shooting mode, a landscape shooting mode, a close-up shooting mode, a sports shooting mode, a night scene shooting mode, and a panorama shooting mode.

A first shutter switch 62 is activated when a shutter button (not shown) is pressed half-way. The first shutter switch 62 instructs the system control unit 50 to start operations such as the AF processing, the AE processing, the AWB processing, and the EF processing.

A second shutter switch 64 is activated when the shutter button (not shown) is fully pressed. The second shutter switch 64 instructs the system control unit 50 to start a series of recording operations including exposure processing, development processing, and recording processing. The exposure processing is to write an analog image signal read out from the image sensor 12 in the memory 30 through the A/D converter 16 and the memory control unit 22. The development processing uses the calculation processing performed by the image processing unit 20 or the memory control unit 22. In the recording processing, the image data read out from the memory 30 is compressed by the compression and decompression unit 32 and recorded in the recording medium 200.

An image reproduction switch 66 instructs the system control unit 50 to start an image reproduction mode when the electronic camera 100 is in a shooting mode. The system control unit 50 performs the image reproduction operation mode which reads out the captured image from the memory 30 or the recording medium 200, and displays the captured image on the image display unit 28.

A single shooting/continuous shooting switch 68 is used for the system control unit 50 to set a single shooting mode or a continuous shooting mode. If the second shutter switch 64 is activated when the electronic camera is in the single shooting mode, a single frame is captured and then the electronic camera 100 waits in a standby state. If the second shutter switch 64 is activated when the electronic camera is in the continuous shooting mode, a plurality of frames are continuously captured.

The operation unit 70 includes various buttons and a touch panel. The operation unit 70 includes as its function, a menu button, a set button, a macro button, a multiple-screen scroll button, a flash setting button, a single shooting/continuous shooting/self timer switch button, a menu scroll+(plus) button, a menu scroll−(minus) button, a reproduced image scroll+(plus) button, a reproduced image scroll−(minus) button, an image quality selection button, an exposure compensation button, and a date/time setting button.

Further, the operation unit 70 includes a selection/switch button, a determination/execution button, an image display on/off switch, a quick review on/off switch, and a compression mode switch. The selection/switch button is used for selecting or switching various functions when the electronic camera 100 captures or reproduces images in the panorama mode or the like. The determination/execution button is used for determining or executing various functions when the electronic camera 100 captures or reproduces images in the panorama mode or the like. The image display on/off switch is used for turning on/off the display of the image display unit 28. The quick review on/off switch is used for setting a quick review function to perform an auto-reproduction of an image data directly after the image is captured. The compression mode switch is used to select a compression ratio of JPEG (joint photographic experts group) compression, or a CCD-RAW (charge-coupled device RAW) mode for digitizing a signal from the image sensor as it is and record the signal in a recording medium.

Furthermore, the operation unit 70 includes an AF mode setting switch used for setting one of a one-shot AF mode and a servo AF mode. The one-shot AF mode is used for starting an auto focus operation while the first shutter switch 62 is activated and keeping an in-focus state once an object is in focus. The servo AF mode is used for continuously maintaining the auto focus operation while the first shutter switch 62 is activated. A rotary dial switch allows the above-described plus and minus buttons to make a smoother selection of modes and values for each function.

The power switch 72 is used for turning on/off the power of the electronic camera 100. The power switch 72 is also used for turning on/off the power of various auxiliary devices connected to the electronic camera 100 including the lens unit 300, an external flash unit, and the recording medium 200.

A power supply control unit 80 includes a battery detection apparatus, a DC-DC (direct current to direct current) converter, and a switch apparatus used for switching current-carrying blocks. The power supply control unit 80 detects a presence of a battery, a type of the battery, and a remaining battery level. Based on a result of the detection and the instruction from the system control unit 50, the power supply control unit 80 controls the DC-DC converter and supplies a required voltage for a required time period to units including the recording medium 200.

A power supply unit 86 is connected to the power supply control unit 80 through connectors 82 and 84. The power supply unit 86 includes a primary battery such as an alkaline battery or a lithium battery, a secondary battery such as a Ni—Cd (nickel-cadmium) battery, a Ni—MH (nickel metal hydride) battery, or a lithium battery, or an AC adapter.

The recording medium 200 is connected to a bus which is connected to the system control unit 50 through a connector 92 and an interface 90. The recording medium 200 can be connected with two lines of the interface 90 and the connector 92. Further, interfaces and connectors of different standards can be used together. Some of the interfaces 90 and the connectors 92 comply with PCMCIA (personal computer memory card international association) card or a specific memory card. Further, by connecting various communication cards such as a LAN (local area network) card, a modem card, a USB (universal serial bus) card, IEEE (an institute of electrical and electronics engineers) 1394 card, a P1284 card, a SCSI (small computer system interface) card, or a communication card for a PHS (personal handyphone system) to the connector 92, the recording medium 200 can mutually exchange image data or management information of the image data with another computer and a peripheral device such as a printer or the like.

A communication device 110 includes various communication functions such as RS-232C (recommended standard 232 version C), USB, IEEE 1394, P1284, SCSI, modem, LAN, and wireless communication function. A connector/antenna 112 allows the electronic camera 100 to connect with other apparatuses by using the communication device 110.

An interface 120 is used for electrically connecting the electronic camera 100 and the lens unit 300. The interface 120 is connected to an interface 320 of the lens unit 300 through a connector 122 and a connector 322 of the lens unit 300. The connector 122 is used for mutually transferring, for example, a control signal, a state signal, or a data signal between the electronic camera 100 and the lens unit 300. Further, the connector 122 is used for supplying electric current with various voltages to the lens unit 300 from the electronic camera 100.

The connector 122 can be a medium not only for telecommunications but also for transferring an optical signal or an audio signal.

The recording medium 200 includes a recording unit 202 and a connector 206. The recording unit 202 includes, for example, a semiconductor memory or a magnetic disk. The connector 206 is connected to an interface 204 and the connector 92 of the electronic camera 100.

The lens unit 300 is an interchangeable lens type unit and includes the lens mount 306 which mechanically joins with the lens mount 106 of the electronic camera 100. The connectors 322 and 122 are practically integrated in the lens mounts 306 and 106 respectively. Further, the lens unit 300 includes the lens 310, the diaphragm 312, and the interface 320.

The diaphragm control unit 340 controls the diaphragm 312 together with the shutter control unit 40 based on the metering information from the light metering unit 46. The distance measurement control unit 342 controls focusing of the lens 310. A zoom control unit 344 controls zooming of the lens 310. A lens control unit 350 controls the whole lens unit 300. The lens control unit 350 includes a memory used in recording constants, variables, programs, etc. for operation, and a non-volatile memory used in storing identification information such as a unique number of the lens unit 300, management information, function information such as maximum and minimum aperture values and focal length, and present and past setting values.

Figure 5:
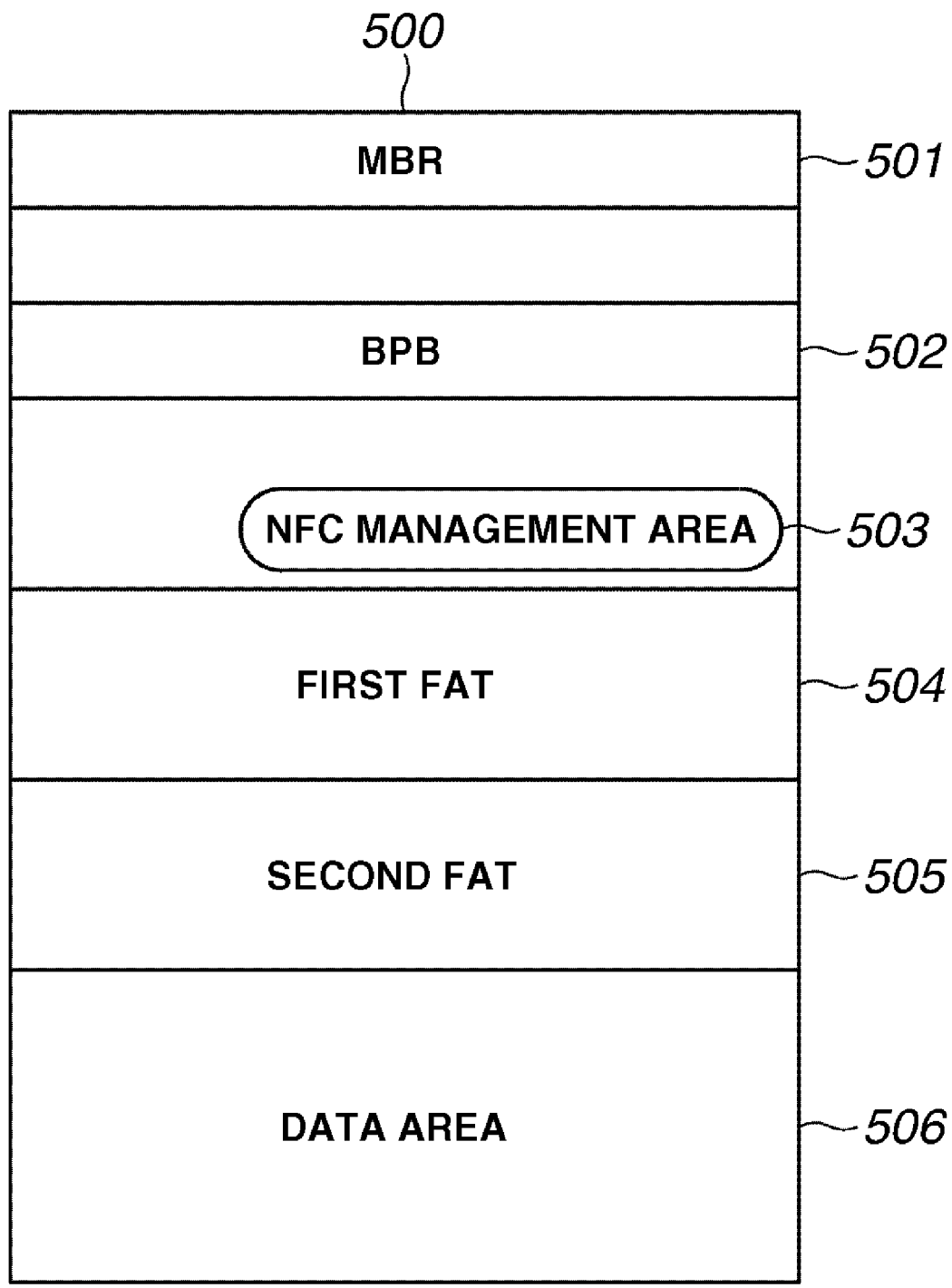
FIG. 5 is an example of a configuration of a file system applied to a recording medium illustrated in FIG. 1.

FIG. 5 is an example configuration of a file system 500 applied to the recording medium 200.

The file system 500 includes a MBR (master boot record) 501, a BPB (BIOS parameter block) 502, a NFC (number of free clusters) management area 503, a first FAT (file allocation table) 504, a second FAT (file allocation table) 505, and a data area 506. The MBR 501 is an area where a position and a size of a partition are recorded. The BPB 502 is an area where physical information such as a sector size and a cluster size of the recording medium 200 is recorded. The NFC management area 503 is an area where the number of free clusters in the recording medium 200 is recorded. In the case of a FAT32 format, an area called a FSINFO area corresponds to the NFC management area 503. The first FAT 504 and the second FAT 505 are areas where the file management information indicating a location of the file is recorded. The data area 506 is an area where a file such as the image file is recorded. The images captured by the electronic camera 100 are stored in the data area 506.

Figure 2:
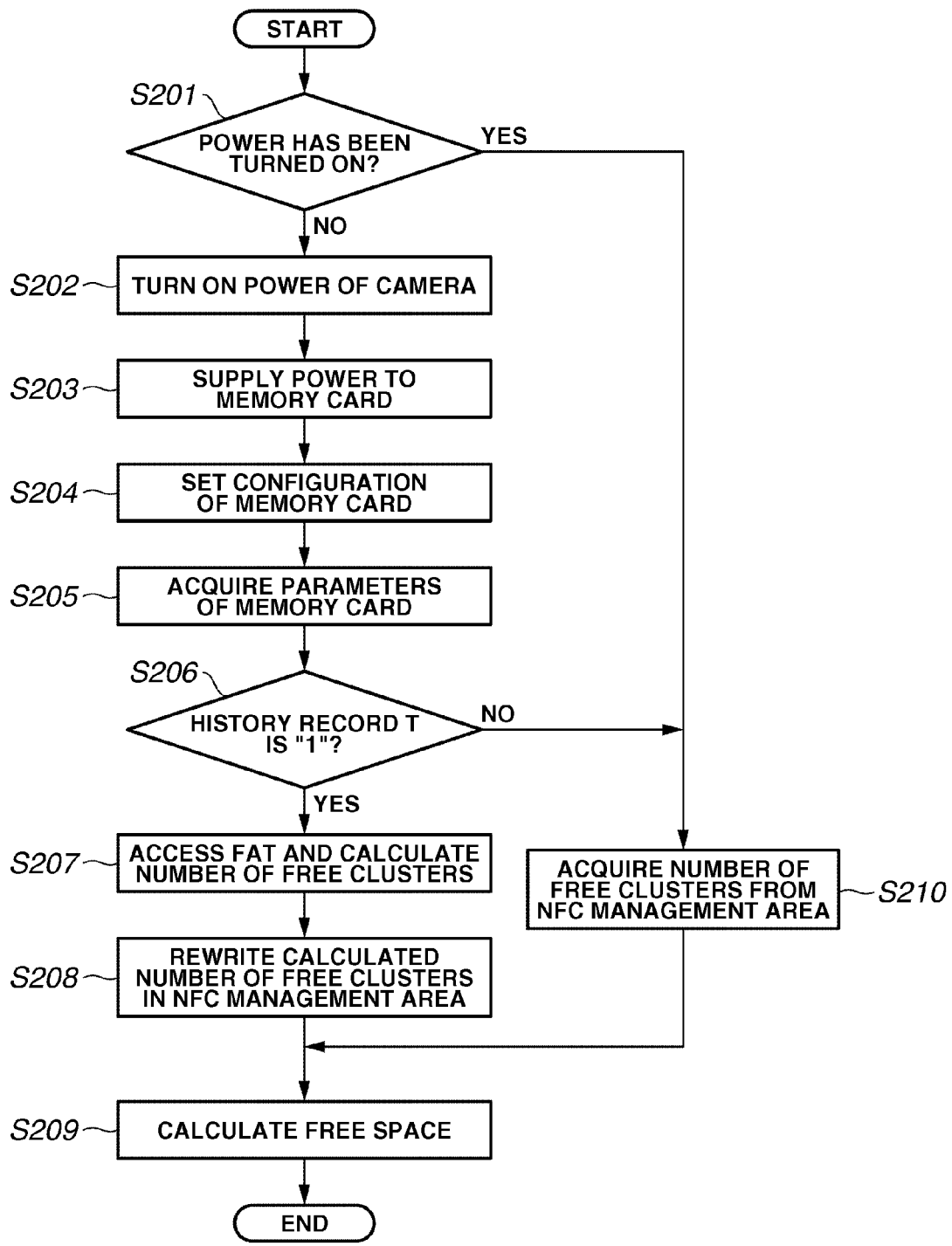
FIG. 2 is a flowchart illustrating free space calculation processing according to the first exemplary embodiment of the present invention.

FIG. 2 is a flowchart illustrating free space calculation processing according to the present exemplary embodiment. The free space calculation processing according to the present exemplary embodiment will be described referring to FIG. 2. The flowchart in FIG. 2 is based on an assumption that the recording medium 200 has been connected to the connector 92 of the electronic camera 100. Further, the free space calculation processing in FIG. 2 is controlled by the system control unit 50 according to a program recorded in the memory 52.

In step S201, the system control unit 50 determines whether the power of the electronic camera 100 has been turned on. If the power of the electronic camera 100 is not turned on (NO in step S201), and then in step S202, a user turns on the power switch 72, the process proceeds to step S203. In step S203, the system control unit 50 supplies power to the recording medium 200 through the power supply control unit 80. Here, a memory card including a non-volatile memory can be used for the recording medium 200. The memory card includes, for example, a CompactFlash card and a SD (Secure Digital) memory card.

If the power of the electronic camera 100 has been turned on (YES in step S201), then in step S210, the system control unit 50 accesses the NFC management area 503 in the recording medium 200 and acquires the number of free clusters stored in the NFC management area 503.

In step S203, the system control unit 50 supplies power to the recording medium 200. Then in step S204, the system control unit 50 sets up the register, issues a command, and sets up the recording medium 200 in a state that can be operated.

In step S205, the system control unit 50 accesses the MBR 501 and the BPB 502 and acquires parameters such as partition information, a total number of sectors, a cluster size, a sector size, and a FAT type of the recording medium 200.

In step S206, the system control unit 50 refers to the attachment/detachment history record T recorded in the non-volatile memory 56 and determines whether the recording medium 200 is removed from the electronic camera 100 while the power of the electronic camera 100 is turned off. According to the present exemplary embodiment, if the attachment/detachment history record T is "1" (YES in step S206), the system control unit 50 determines that the recording medium 200 is removed from the electronic camera 100 while the power of the electronic camera 100 is turned off, and the process proceeds to step S207. If the attachment/detachment history record T is "0" (NO in step S206), then the system control unit 50 determines that the recording medium 200 is not removed from the electronic camera 100 while the power of the electronic camera 100 is turned off, and the process proceeds to step S210.

In the case where the attachment/detachment history record T is "1" (YES in step S206), in step S207, the system control unit 50 calculates the number of free clusters by accessing the first FAT 504 and the second FAT 505. In step S208, the system control unit 50 overwrites the number of free clusters calculated in step S207 in the NFC management area 503. In this way, even if the number of free clusters stored in the NFC management area 503 is not correct, it can be corrected.

In the case where the attachment/detachment history record T is "0" (NO in step S206), in step S210, the system control unit 50 accesses the NFC management area 503 in the recording medium 200 and acquires the number of free clusters stored in the NFC management area 503.

In step S209, the system control unit 50 calculates a free space in the recording medium 200 using the number of free clusters calculated in step S207 or the number of free clusters acquired in step S210, and the cluster size and the sector size acquired in step S205. Then, the system control unit 50 displays the calculated free space on at least one of the status display unit 54 and the image display unit 28, and completes the start-up process. After the start-up process is completed, the system control unit 50 writes the captured image in the recording medium 200 according to an instruction from the user.

As described above, according to the electronic camera 100 of the present exemplary embodiment, the calculation method of the free space in the recording medium 200 can be changed according to the attachment/detachment history record T of the recording medium 200. Thus, a precise free space in the recording medium 200 can be calculated promptly with improved reliability.

Further, according to the electronic camera 100 of the present exemplary embodiment, if the recording medium 200 is not removed from the electronic camera 100 while the power of the electronic camera 100 is turned off, the free space in the recording medium 200 can be correctly calculated based on the number of free clusters acquired from the NFC management area 503. Further, in such a case, since the free space in the recording medium 200 can be calculated based on the number of free clusters acquired from the NFC management area 503, the electronic camera 100 can be promptly started up and the captured image can be promptly recorded in the recording medium 200.

Further, according to the electronic camera 100 of the present exemplary embodiment, the number of free clusters calculated by the electronic camera 100 can be overwritten in the NFC management area 503. Thus, even if the number of free clusters recorded in the NFC management area 503 is not correct, the free space in the recording medium 200 can be precisely calculated.

Second Exemplary Embodiment

A second exemplary embodiment of the present invention will be described. According to the second exemplary embodiment, components similar to those in the first exemplary embodiment are denoted by the same reference numerals and their description is omitted for simplification.

According to the first exemplary embodiment, correctness of the free space in the recording medium 200 is always checked while the power of the electronic camera 100 is turned on. In the second exemplary embodiment, whether to check correctness of the free space in the recording medium 200 is selected by a user.

Figure 3:
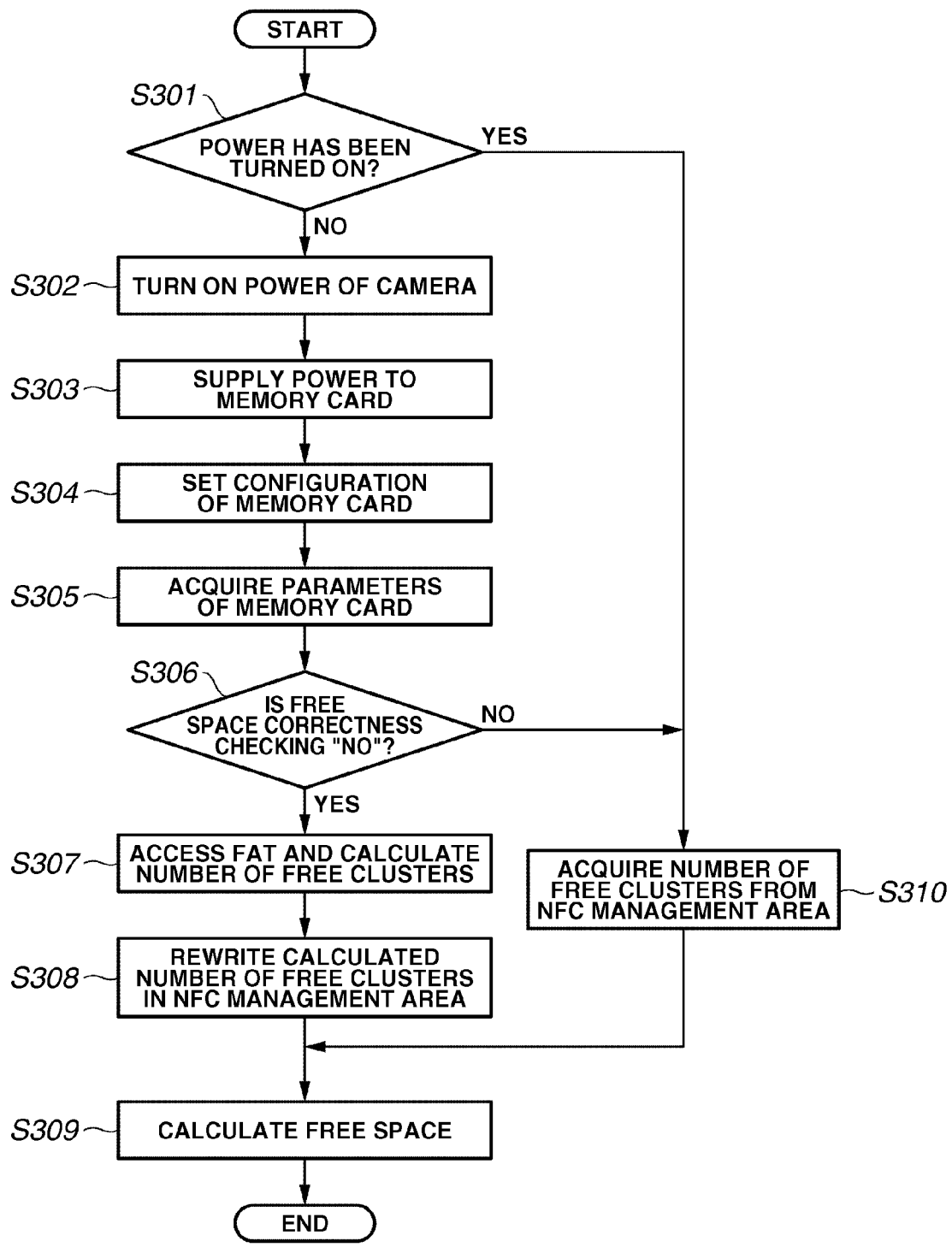
FIG. 3 is a flowchart illustrating free space calculation processing according to the second exemplary embodiment of the present invention.
Figure 4:
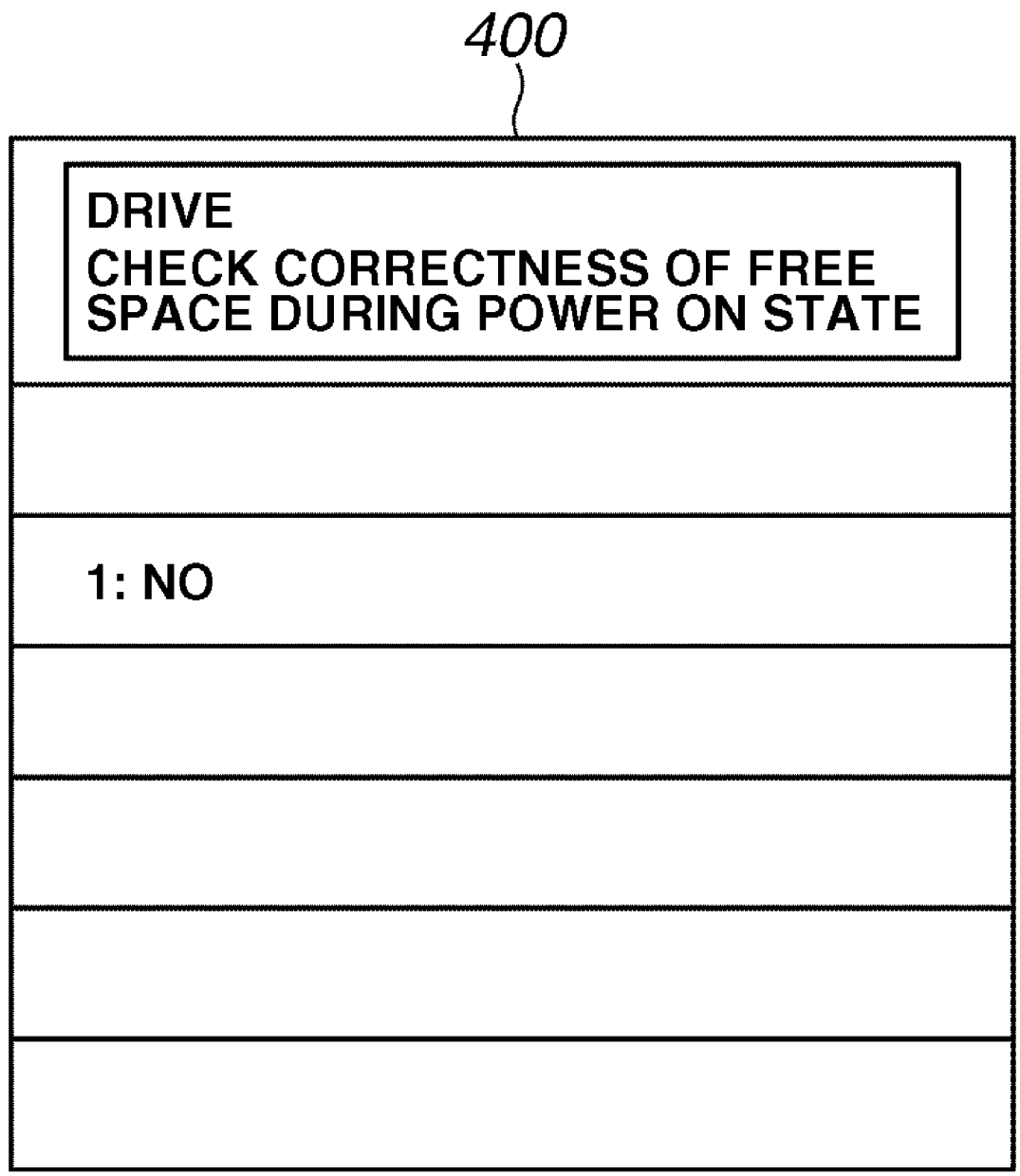
FIG. 4 illustrates an example of a setting screen according to the second exemplary embodiment of the present invention.

FIG. 3 is a flowchart illustrating free space calculation processing according to the present exemplary embodiment. FIG. 4 illustrates an example of a setting screen used for setting whether to check the correctness of the free space in the recording medium 200.

A setting screen 400 illustrated in FIG. 4 is an example setting screen of the electronic camera 100 and recorded in the memory 52 together with other setting screens (including setting menu). The setting screen 400 is used for activating the free space correctness checking which checks whether the free space in the recording medium 200 is correct. If "0: YES" is selected, the system control unit 50 records "0" in a predetermined area FG in the non-volatile memory 56 to turn ON the free space correctness checking. If the free space correctness checking is ON, the electronic camera 100 performs the free space correctness checking when the power of the electronic camera 100 is turned on. On the other hand, if "1: NO" is selected, the system control unit 50 records "1" in a predetermined area FG in the non-volatile memory 56 to turn OFF the free space correctness checking. If the free space correctness checking is OFF, the electronic camera 100 does not perform the free space correctness checking when the power of the electronic camera 100 is turned on. The design and configuration of the setting screen 400 is not limited to the configuration shown in FIG. 4.

Now, a process of calculating a free space according to the present exemplary embodiment will be described referring to FIG. 3. The flowchart in FIG. 3 is based on an assumption that the recording medium 200 is connected to the connector 92 of the electronic camera 100. Further, the free space calculation processing in FIG. 3 is controlled by the system control unit 50 according to a program recorded in the memory 52.

In step S301, the system control unit 50 determines whether the power of the electronic camera 100 has been turned on. If the power of the electronic camera 100 is not turned on (NO in step S301), and then in step S302, a user turns on the power switch 72, the process proceeds to step S303. In step S303, the system control unit 50 supplies power to the recording medium 200 through the power supply control unit 80.

If the power of the electronic camera 100 has been turned on (YES in step S301), then in step S310, the system control unit 50 accesses the NFC management area 503 in the recording medium 200 and acquires the number of free clusters stored in the NFC management area 503.

In step S303, the system control unit 50 supplies power to the recording medium 200. Then in step S304, the system control unit 50 sets up the register, issues a command, and sets up the recording medium 200 in a state that can be operated.

In step S305, the system control unit 50 accesses the MBR 501 and the BPB 502 and acquires parameters such as partition information, a total number of sectors, a cluster size, a sector size, and a FAT type of the recording medium 200.

In step S306, the system control unit 50 refers to the predetermined area FG in the non-volatile memory 56 and determines whether to perform the free space correctness checking. If "0" is recorded in the area FG (YES in step S306), then the electronic camera 100 determines that the free space checking processing is ON and the process proceeds to step S307. If "1" is recorded in the area FG (NO in step S306), then the electronic camera 100 determines that the free space checking processing is OFF and the process proceeds to step S310.

In the case where the free space checking processing is ON (YES in step S306), in step S307, the system control unit 50 calculates the number of free clusters by accessing the first FAT 504 and the second FAT 505. In step S308, the system control unit 50 overwrites the number of free clusters calculated in step S307 in the NFC management area 503. In this way, even if the number of free clusters stored in the NFC management area 503 is not correct, the number of free clusters can be corrected In the case where the free space checking processing is OFF (NO in step S306), in step S310, the system control unit 50 accesses the NFC management area 503 in the recording medium 200 and acquires the number of free clusters stored in the NFC management area 503.

In step S309, the system control unit 50 calculates a free space in the recording medium 200 using the number of free clusters calculated in step S307 or the number of free clusters acquired in step S310, and the cluster size and the sector size acquired in step S305. Then, the system control unit 50 displays the calculated free space on at least one of the status display unit 54 and the image display unit 28, and completes the start-up process. After the start-up process is completed, the system control unit 50 writes the captured image in the recording medium 200 according to an instruction from the user.

As described above, according to the electronic camera 100 of the present exemplary embodiment, the user can arbitrarily select whether to check the correctness of the number of free clusters. Accordingly, in a case where the recording medium 200 is removed from the electronic camera 100 and attached again while the content of the recording medium 200 is unchanged, the electronic camera 100 can be promptly started up, and the convenience of the electronic camera 100 will be increased. Further, if the user previously knows that a correct number of free clusters is recorded in the NFC management area 503 of the recording medium 200, the electronic camera 100 can be started up promptly and user convenience will therefore be enhanced.

According to the first and the second exemplary embodiments of the present invention, an electronic camera is described as an example of the image capture apparatus of the present invention. However, the image capture apparatus according to the present invention is not limited to an electronic camera and can be applied to a digital video camera, a camera-equipped mobile device, a camera-equipped mobile phone or the like.

Further, various processing procedures described in the first and the second exemplary embodiments can be realized by a computer, such as a micro computer or a personal computer, which executes a computer-executable program. In this case, a computer-executable program which realizes a part or whole of the processing procedures described in the first and the second exemplary embodiments is provided to the computer through a network or a recording medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-040001 filed Feb. 20, 2007, which is hereby incorporated by reference herein in its entirety.

What is claimed is:

1. An image capture apparatus comprising:
   an image capture unit that captures an image;
   a storing unit that stores the captured image in a recording medium attached to the image capture apparatus;
   a detecting unit that detects whether or not the recording medium attached to the image capture apparatus is removed from the image capture apparatus when a power switch of the image capture apparatus is off; and
   a control unit that (a) accesses a predetermined area in the recording medium to obtain the number of free clusters if the detecting unit does not detect that the recording medium attached to the image capture apparatus is removed from the image capture apparatus when the power switch of the image capture apparatus is off, (b) calculates a free space in the recording medium from the obtained number of free clusters, (c) calculates a number of free clusters in the recording medium if the detecting unit detects that the recording medium attached to the image capture apparatus is removed from the image capture apparatus when the power switch of the image capture apparatus is off, and (d) calculates a free space in the recording medium from the calculated number of free clusters.

2. The image capture apparatus according to claim 1, wherein the image capture apparatus writes the calculated number of free clusters in the predetermined area in the recording medium if the detecting unit detects that the recording medium attached to the image capture apparatus is removed from the image capture apparatus when the power switch of the image capture apparatus is off.

3. The image capture apparatus according to claim 1, wherein the image capture apparatus is one of an electronic camera, a digital video camera, a camera-equipped mobile device, and a camera-equipped mobile phone.

4. An image capture apparatus comprising:

an image capture unit that captures an image;

a storing unit that stores the captured image in a recording medium attached to the image capture apparatus;

a memory that (a) stores first information when a process of checking correctness of a free space in the recording medium is activated by a user, and (b) stores second information which is different from the first information when the process of checking correctness of the free space in the recording medium is not activated by the user; and a control unit that (a) accesses a predetermined area in the recording medium to obtain the number of free clusters if the second information is stored in the memory, (b) calculates a free space in the recording medium from the obtained number of free clusters, (c) calculates a number of free clusters in the recording medium if the first information is stored in the memory, and (d) calculates a free space in the recording medium from the calculated number of free clusters.

5. The image capture apparatus according to claim 4, wherein the image capture apparatus writes the calculated number of free clusters in the predetermined area in the recording medium if the first information is stored in the memory.

6. The image capture apparatus according to claim 4, wherein the image capture apparatus is one of an electronic camera, a digital video camera, a camera-equipped mobile device, and a camera-equipped mobile phone.

7. The image capture apparatus according to claim 1, wherein the recording medium includes one of a semiconductor memory and a magnetic disk.

8. The image capture apparatus according to claim 1, wherein the control unit turns off power of the image capture apparatus if the detecting unit detects that the recording medium attached to the image capture apparatus is removed from the image capture apparatus when the power switch of the image capture apparatus is not off.

9. The image capture apparatus according to claim 4, wherein the recording medium includes one of a semiconductor memory and a magnetic disk.

10. The image capture apparatus according to claim 4, wherein the control unit turns off power of the image capture apparatus if the detecting unit detects that the recording medium attached to the image capture apparatus is removed from the image capture apparatus when the power switch of the image capture apparatus is not off.

11. A method of controlling an image capture apparatus, the image capture apparatus including an image capture unit that captures an image and a storing unit that stores the captured image in a recording medium attached to the image capture apparatus, the method comprising:

controlling a detecting unit of the image capture apparatus to detect whether or not the recording medium attached to the image capture apparatus is removed from the image capture apparatus when a power switch of the image capture apparatus is off;

controlling the image capture apparatus to access a predetermined area in the recording medium to obtain the number of free clusters if the detecting unit does not detect the recording medium attached to the image capture apparatus is not removed from the image capture apparatus when the power switch of the image capture apparatus is off;

controlling the image capture apparatus to calculate a free space in the recording medium from the obtained number of free clusters;

controlling the image capture apparatus to calculate a number of free clusters in the recording medium if the detecting unit detects the recording medium attached to the image capture apparatus is removed from the image capture apparatus when the power switch of the image capture apparatus is off; and controlling the image capture apparatus to calculate a free space in the recording medium from the calculated number of free clusters.

12. The method according to claim 11, further comprising:

controlling the image capture apparatus to write the calculated number of free clusters in the predetermined area in the recording medium if the detecting unit detects that the recording medium attached to the image capture apparatus is removed from the image capture apparatus when the power switch of the image capture apparatus is off.

13. The method according to claim 11, wherein the image capture apparatus is one of an electronic camera, a digital video camera, a camera-equipped mobile device, and a camera-equipped mobile phone.

14. The method according to claim 11, wherein the recording medium includes one of a semiconductor memory and a magnetic disk.

15. The method according to claim 11, further comprising:

controlling the image capture apparatus to turn off power of the image capture apparatus if the detecting unit detects that the recording medium attached to the image capture apparatus is removed from the image capture apparatus when the power switch of the image capture apparatus is not off.

16. A method of controlling an image capture apparatus, the image capture apparatus including an image capture unit that captures an image and a storing unit that stores the captured image in a recording medium attached to the image capture apparatus, the method comprising:

controlling the image capture apparatus to store first information in a memory included in the image capture apparatus when a process of checking correctness of a free space in the recording medium is activated by a user;

controlling the image capture apparatus to store second information which is different from the first information in the memory when the process of checking correctness of the free space in the recording medium is not activated by the user;

controlling the image capture apparatus to access a predetermined area in the recording medium to obtain the number of free clusters if the second information is stored in the memory;

controlling the image capture apparatus to calculate a free space in the recording medium from the obtained number of free clusters;

controlling the image capture apparatus to calculate a number of free clusters in the recording medium if the first information is stored in the memory; and controlling the image capture apparatus to calculate a free space in the recording medium from the calculated number of free clusters.

17. The method according to claim 16, further comprising: controlling the image capture apparatus to write the calculated number of free clusters in the predetermined area in the recording medium if the first information is stored in the memory.

18. The method according to claim 16, wherein the image capture apparatus is one of an electronic camera, a digital video camera, a camera-equipped mobile device, and a camera-equipped mobile phone.

19. The method according to claim 16, wherein the recording medium includes one of a semiconductor memory and a magnetic disk.

20. The method according to claim 16, further comprising: controlling the image capture apparatus to turn off power of the image capture apparatus if the detecting unit detects that the recording medium attached to the image capture apparatus is removed from the image capture apparatus when the power switch of the image capture apparatus is not off.

* * * * *